W. P. ANDERSON.
Clod-Crushers.

No. 154,629.        Patented Sept. 1, 1874.

Witnesses
John L. Boone
C. M. Richardson

Inventor
William P. Anderson
by Dewey & Co.
Attys

UNITED STATES PATENT OFFICE.

WILLIAM P. ANDERSON, OF ALBANY, OREGON.

IMPROVEMENT IN CLOD-CRUSHERS.

Specification forming part of Letters Patent No. 154,629, dated September 1, 1874; application filed April 30, 1874.

*To all whom it may concern:*

Be it known that I, WILLIAM P. ANDERSON, of Albany, Linn county, State of Oregon, have invented an Improved Clod-Crusher; and I do hereby declare the following description and accompanying drawings are sufficient to enable any person skilled in the art or science to which it most nearly appertains to make and use my said invention or improvement without further invention or experiment.

My invention relates to an improved machine for breaking the clods and pulverizing the soil of plowed ground preparatory to planting or sowing it with seed.

In order to explain my invention, reference is had to the accompanying drawings forming a part of this specification, in which—

Figure 1:
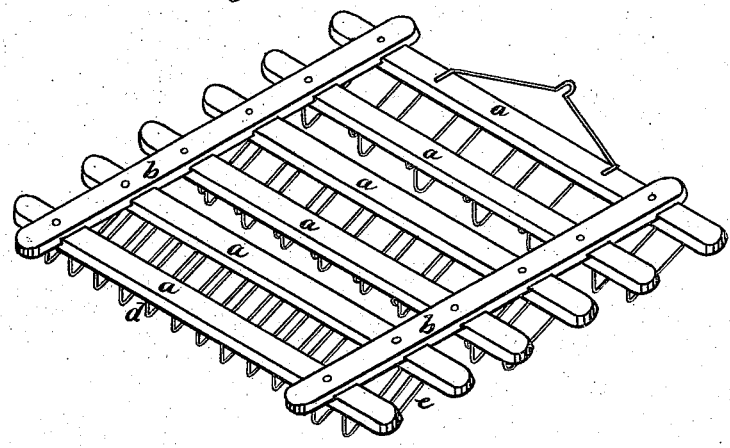
Figure 2:
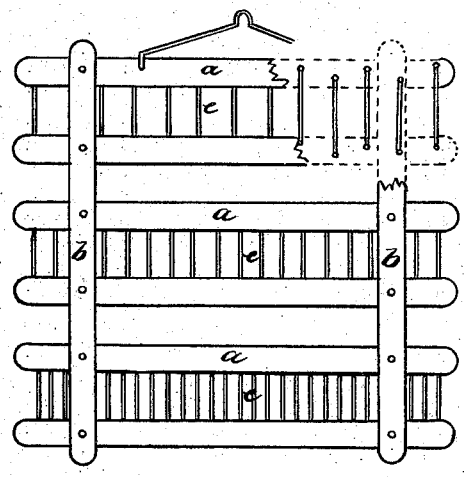
Figure 3:
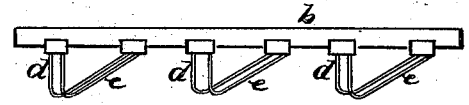
Figure 4:
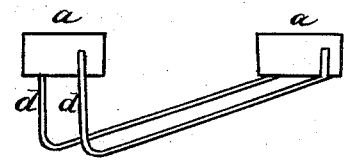

Figure 1 is a perspective view of my invention. Fig. 2 is a plan, and Figs. 3 and 4 are side views.

To construct my improved clod-breaker or harrow I make a frame similar to a harrow-frame, and provide it with two or more parallel beams or timbers, $a\ a$, similar to the transverse timbers of an ordinary harrow, in which the teeth are secured. In the present instance I have represented a square frame, in which six parallel transverse timbers, $a\ a\ a$, are secured together by means of the side timbers $b\ b$. To form the teeth or clod-breakers I employ pieces of wire, $e\ e$, of nearly equal length. Each piece of wire has a portion, $d$, at one end bent at right angles, or to an angle approximating to a right angle, to the other portion, as shown, the bent portion $d$ being shorter than the other portion of the wire. I then secure the end of the longest portion of each wire to the under side of the first transverse timber, while the end of the short end $d$ is secured to the second timber $a$. Usually these ends will be secured to the timbers by being sharpened and driven into the wood of the timbers; but they can be secured by screws, bolts, or other convenient means. The first row of these bent wires or teeth are thus secured in the first two transverse timbers $a\ a$ of the machine at the desired distance apart, so as to form a series of bent wires having their longest portion inclined toward the front of the machine, the pitch of the incline being determined by the length of the shorter portion $d$ of the wires. I also secure, in the same manner, a second row or series of teeth, similar to that above described, in the third and fourth timbers, and another in the fifth and sixth timbers, thus providing two or more transverse series of inclined wire teeth, passing across the machine, while the wire of the teeth extends lengthwise in the direction of the travel of the machine.

I prefer to place each alternate tooth in each row slightly in advance of the other teeth.

The teeth in the first row or series are placed farther apart than those in the second row, while those in the third row are placed still closer together, thus providing for a gradual breaking or pulverization of the soil.

Having thus described my invention, I claim—

A harrow or clod-pulverizer having two or more series or rows of inclined wire teeth arranged to stand in the direction of the machine, the teeth being placed closer in each succeeding row from front to rear, substantially as set forth.

In witness whereof I hereunto set my hand and seal.

WILLIAM PERREN ANDERSON. [L. S.]

Witnesses:
 L. KLINE,
 J. W. BALDWIN.